G. A. IMHOFF.
AUTOMOBILE WHEEL.
APPLICATION FILED JAN. 10, 1912.
1,054,692.
Patented Mar. 4, 1913.
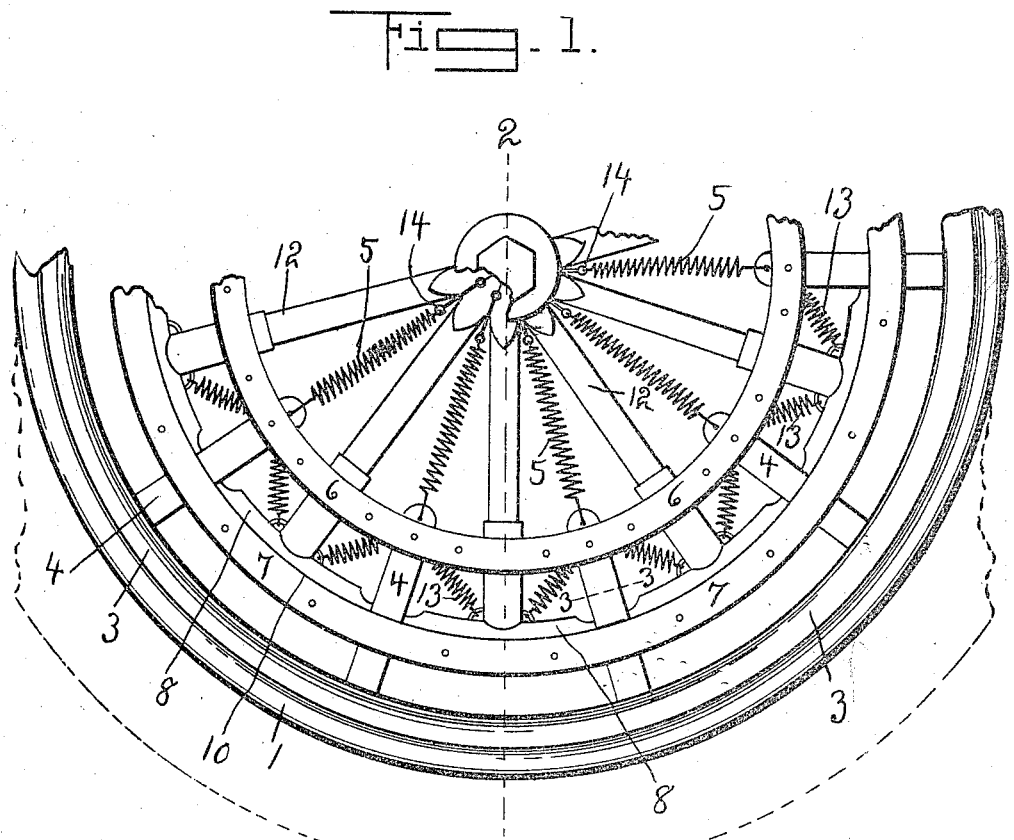
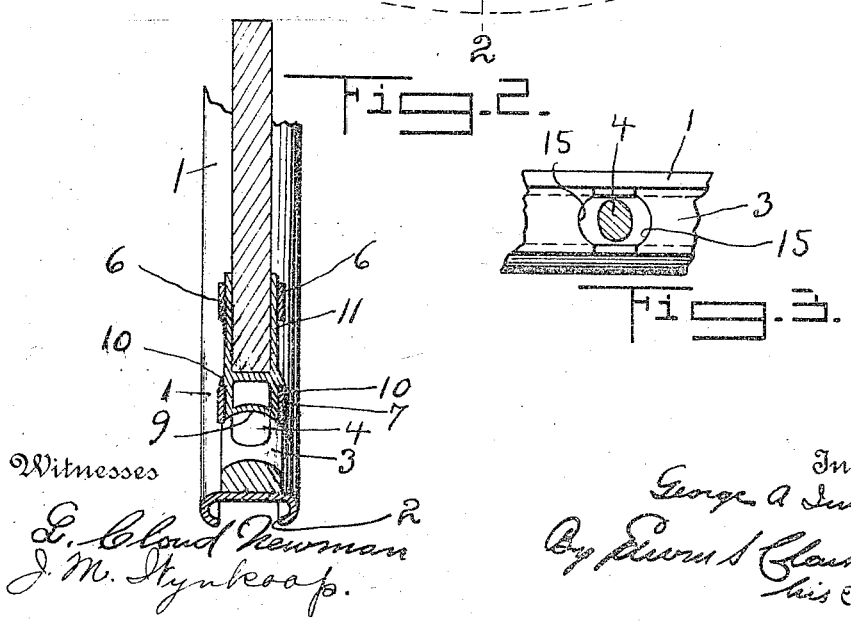

UNITED STATES PATENT OFFICE.

GEORGE A. IMHOFF, OF CARRINGTON, NORTH DAKOTA.

AUTOMOBILE-WHEEL.

1,054,692.  Specification of Letters Patent.  Patented Mar. 4, 1913.

Application filed January 10, 1912. Serial No. 670,455.

*To all whom it may concern:*

Be it known that I, GEORGE A. IMHOFF, a citizen of the United States, residing at Carrington, in the county of Foster and State of North Dakota, have invented certain new and useful Improvements in Automobile-Wheels, of which the following is a specification.

The object of my invention is to provide a wheel for automobiles or other vehicles of such construction that it will be resilient to take up shocks incident to travel on the road, and at the same time be of simple, yet strong and durable construction; and with this and minor objects in view, my invention consists of the parts and combination of parts as will be hereinafter more fully set forth.

In the drawing, Figure 1 is a view partly in side elevation and partly in section of a portion of a wheel embodying my invention; Fig. 2 is a sectional view of the same on the line 2—2, Fig. 1, and, Fig. 3 is a sectional view on the line 3—3, Fig. 1.

1 represents the rim of the wheel, which may be of any approved construction and provided with any suitable locking means 2 to retain a solid rubber tire on said rim. Of course, it will be understood that the rim 2 may be built for use without a rubber tread or tire. The rim is provided with a rounded rib or projection 3 on its inner face extending the full length or inner circumference of the rim.

4 are short spokes secured in the rounded rib or projection 3 of the rim 1, the inner ends of which are attached to one end of coil springs 5.

6 is a band rigidly secured to the short spokes 4 near their inner ends, there being two of these bands, one on each side of the spokes.

7 is the rim of the inner wheel, said rim consisting of two members spaced apart, between which the short spokes 4 project.

8 is a shoe provided with a concave under face 9 adapted under some conditions to fit over the rib 3 of the rim 1. This shoe is provided with shoulders 10 which rest upon the rim 7, the inner portion of the shoe projecting down between the bands 6. This shoe is provided with a tubular extension 11 adapted to receive the spokes 12 which are secured therein. The shoe is suspended from the short spokes 4 by means of coil springs 13, one end of said springs being secured to the spokes 4 near their inner ends, while the other end of said springs is secured to the shoe at the base of the tubular extension 11, as clearly shown in the drawings. The series of spokes 12 are suitably secured in the hub of the wheel in any well-known manner.

14 are double eyes, one of which is secured between the inner ends of the spokes in the hub, the adjacent faces of the spokes being notched or recessed to receive the eye, and thereby lock it against movement, while the other eye extends to a point beyond the juncture of the inner ends of the spokes and to which the inner ends of the springs 5 are secured, thereby connecting the spokes 4 by a resilient connection directly to the hub of the wheel. The shoes 8 are concaved as at 15 at each end so as to provide play for the shoe between the spokes 4, thereby eliminating the possibility of the shoe cutting the spokes 4 in the various movements of the wheel.

From the above, it will be seen that shocks or blows received on the periphery of the wheel will be taken up by the springs 13 in the lower half of the wheel assisted by the springs 5 in the upper half of the wheel, both springs being under tension when the wheel is subject to a shock. The wheel is prevented from suddenly assuming a normal position by the arrangement of the springs, the springs acting as tension members in their several positions throughout the wheel. The rigidly mounted bands 6 serve as an additional guide to maintain the spokes 12 in alinement with the spokes 4.

I claim:

In a wheel the combination with an inner wheel comprising a hub, spokes fixedly secured thereto, a shoe provided with a concave outer face and with concaved ends, a tubular extension integral with said shoe and constructed to receive the end of said spokes, shoulders on said shoe, and rims engaging the said shoulders on the shoe, of an outer wheel comprising a rim constructed to receive a tire, spokes extending inwardly therefrom between the rims of the inner wheel, coiled springs connecting the inner ends of the spokes of the outer wheel directly with the hub, and coil springs connecting the said shoes with the inner ends of the spokes of the outer wheel.

In testimony whereof I affix my signature in presence of two witnesses.

GEORGE A. IMHOFF.

Witnesses:
E. C. REED,
H. W. ERICASON.